US009573332B2

(12) United States Patent
Robinson et al.

(10) Patent No.: US 9,573,332 B2
(45) Date of Patent: Feb. 21, 2017

(54) THREADABLE HEAT TRANSFER PRESS WITH ADJUSTABLE STAND

(71) Applicant: Stahls' Inc., St. Clair Shores, MI (US)

(72) Inventors: Benjamin B. Robinson, Smithfield, PA (US); Michael Bendis, Uniontown, PA (US); Brian Sukaraukoff, St. Clair Shores, MI (US)

(73) Assignee: Stahls' Inc., St. Clair Shores, MI (US)

( * ) Notice: Subject to any disclaimer, the term of this patent is extended or adjusted under 35 U.S.C. 154(b) by 0 days.

(21) Appl. No.: 13/787,157

(22) Filed: Mar. 6, 2013

(65) Prior Publication Data

US 2013/0233493 A1 Sep. 12, 2013

Related U.S. Application Data

(60) Provisional application No. 61/607,169, filed on Mar. 6, 2012, provisional application No. 61/654,486, filed on Jun. 1, 2012.

(51) Int. Cl.

| | |
|---|---|
| ***B32B 37/00*** | (2006.01) |
| ***B30B 9/00*** | (2006.01) |
| ***B41F 16/02*** | (2006.01) |

(52) U.S. Cl.
CPC ................ *B30B 9/00* (2013.01); *B41F 16/02* (2013.01)

(58) Field of Classification Search
USPC ......... 156/228, 579, 580, 581, 583.1, 583.6, 156/583.7, 583.8, 583.9
See application file for complete search history.

(56) References Cited

U.S. PATENT DOCUMENTS 5,252,171 A * 10/1993 Anderson et al. ............ 156/358
5,408,938 A * 4/1995 Genest .......................... 100/106

* cited by examiner

*Primary Examiner* — James Sells
(74) *Attorney, Agent, or Firm* — Fishman Stewart Yamaguchi PLLC

(57) ABSTRACT

Exemplary presses, e.g., for applying indicia to garments by application of heat, are disclosed. For example, a press may include an upper platen, and a lower platen disposed below and generally aligned with the upper platen. The press may further include a support head adapted to move the upper platen between an open position, wherein the upper and lower platens are spaced away from one another, and a closed position, wherein the upper platen is pressed against the lower platen. Exemplary presses may further include a stand supporting the press.

20 Claims, 11 Drawing Sheets

THREADABLE HEAT TRANSFER PRESS WITH ADJUSTABLE STAND

CROSS-REFERENCE TO RELATED APPLICATION

This application claims priority to U.S. Provisional Patent Application Ser. No. 61/607,169, filed on Mar. 6, 2012, entitled THREADABLE HEAT TRANSFER PRESS WITH ADJUSTABLE STAND, and U.S. Provisional Patent Application Ser. No. 61/654,486, filed on Jun. 1, 2012, entitled THREADABLE HEAT TRANSFER PRESS WITH ADJUSTABLE STAND, and the contents of each of these applications are hereby expressly incorporated by reference in their entireties.

TECHNICAL FIELD

The exemplary illustrations described herein are generally directed to presses, such as heat transfer presses that include platens.

BACKGROUND

Heat applied transfers include a variety of indicia with inks, material layers, and adhesives that become bonded to material layers, for example, apparel such as shirts, jackets, or the like, upon pressurized contact and heating of the transfers and apparel between press platens. Graphic images and lettering may generally be accurately and quickly transferred to the apparel without bleeding or partial interruptions in the bonding of the transfer, as long as the presses can be operated at a predetermined temperature for a predetermined time and at a predetermined pressure.

The presses must be able to accommodate many variations in the arrangement of transfers and apparel, as well as the types of transfers and apparel materials available. Moreover, the presses must accommodate a wide variety of temperatures, pressures, and time intervals associated with application of indicia to a garment. Due to the need for flexibility and economic factors, presses have traditionally been manually operated, i.e., they rely on a user (e.g., an operator) to control at least (a) the force applied through the platens and (b) the length of time the force is applied with a mechanical apparatus.

The accuracy and precision of the temperature, the pressure and the time duration for which these parameters are applied to the transfers are particularly important to complete an efficient bonding of the transfers to materials, and are difficult to accomplish in an accurate and repeatable manner. In particular, depending upon materials and the structure of the indicia to be applied to the apparel, indicia may be subject to inconsistent application conditions throughout the surface of apparel to which the transfer is applied. For example, the application of excessive pressure between the platen pressing surfaces may cause bleeding of the colors, while insufficient pressure may result in blotched or unattached areas where the indicia failed to adhere completely to the garment.

Some basic controls have been employed more recently in some presses, e.g., a timer or sensor to detect an amount of time or magnitude of an applied force, respectively. However, these controls have not solved the essential difficulty of controlling the time or pressure under which heat is actually applied to a garment. For example, difficulties in adjusting timing or pressure settings tends to encourage operators to avoid adjustments even for garments where such adjustments are critical, e.g., between stages of a process where different pressures or timing is needed. Additionally, press operators may tend to go by their “feel”, given their experience, to apply an appropriate amount of pressure. Moreover, there is often a lack of consistency with the same press operator, let alone differences between different presses and press operators.

Known presses are typically relatively large and heavy, and thus operators typically will mount the presses on large tables or stands. Even as presses have become smaller and in some cases more portable, known press stands remain bulky in order to provide adequate stability for the press.

Accordingly, there is a need in the art for an improved press for applying a platen to adhere graphic images or foils to textiles or substrates with a more consistent and repeatable force that facilitates easy adjustments. Additionally, there is a need for an improved press that applies a given force accurately over multiple time intervals. Moreover, there is a need for an improved press that allows accurate application of a force and/or time interval, while also allowing variation of the force and/or time.

BRIEF DESCRIPTION OF THE D WINGS

While the claims are not limited to the illustrated embodiments, an appreciation of various aspects is best gained through a discussion of various examples thereof. Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limiting or restricting to the precise form and configuration shown in the drawings and disclosed in the following detailed description. Exemplary embodiments of the present invention are described in detail by referring to the drawings as follows.

DETAILED DESCRIPTION

Figure 1A:
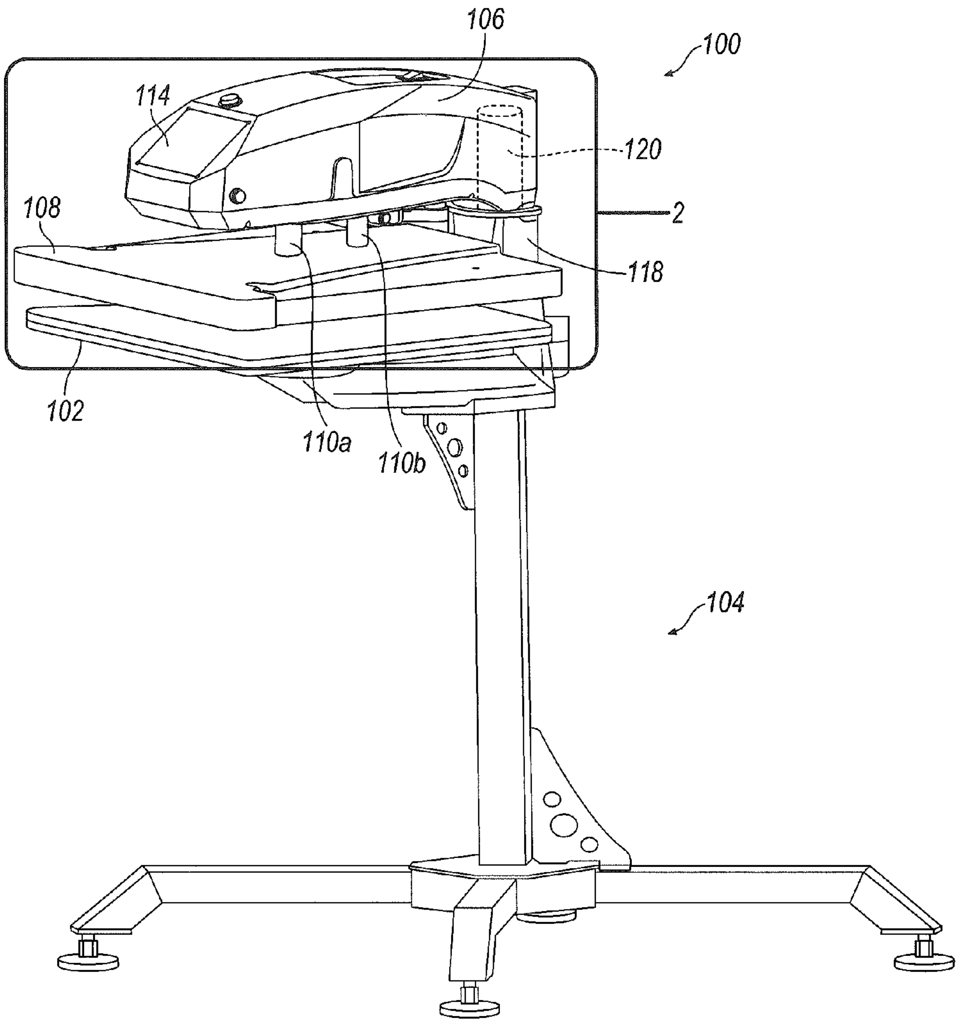
FIG. 1A is a lateral perspective view of an exemplary press.

Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limit or restrict the invention to the precise form and configuration shown in the drawings and disclosed in the following detailed description.

Various exemplary illustrations are provided herein of exemplary presses, e.g., for applying indicia to garments by application of heat. According to one exemplary illustration, a press may include an upper platen, and a lower platen disposed below and generally aligned with the upper platen. The press may further include a support head adapted to move the upper platen between an open position, wherein the upper and lower platens are spaced away from one another, and a closed position, wherein the upper platen is pressed against the lower platen. The exemplary presses may further include a stand positioned on a ground surface and defining a throat spacing beneath the lower platen, the stand being spaced horizontally away from a geometric center of the lower platen. The stand may be adjustable between a plurality of heights.

Figure 1B:
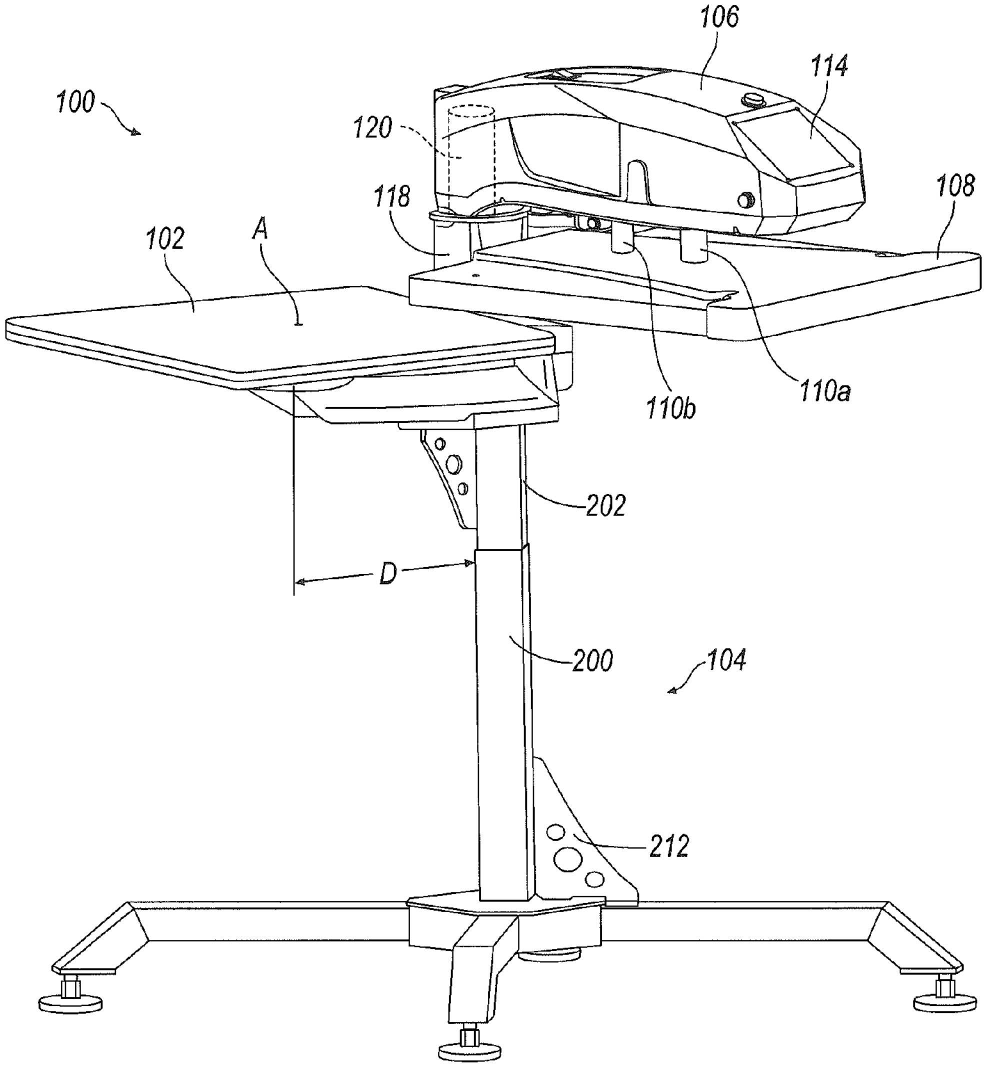
FIG. 1B is a lateral perspective view of the press shown in FIG. 1A, with the support head rotated away from the lower platen.
Figure 2:
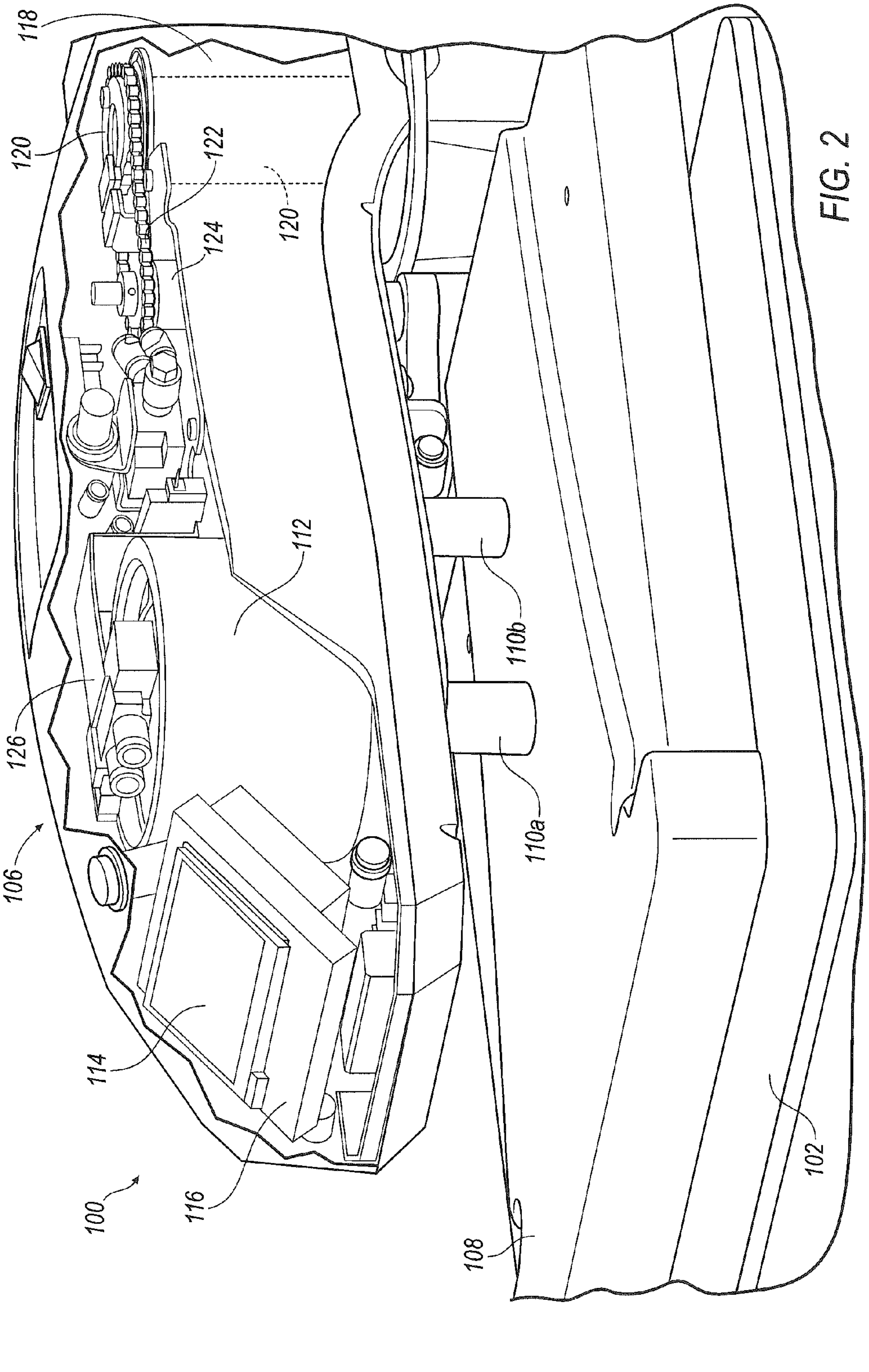
FIG. 2 is a partial cutaway perspective view of the support head of the press shown in FIGS. 1A and 1B.

Referring now to FIGS. 1A, 1B, and 2, an exemplary heat applied transfer press 100 is shown. The press includes a lower platen 102 mounted on a stand 104 or base frame, and a support head 106 supporting an upper platen 108 above the lower platen. Force may be applied to upper platen 108 through a pair of shafts 110*a*, 110*b*. The mechanism for displacing the upper platen to impart a force to the lower platen may include a pneumatic pressure chamber 112. In one example, the platens 102, 108 may include a work structure of a machine tool and a generally flat plate of a press configured to press a material, e.g., a garment, to allow placement of indicia on the garment.

The support head 106 may position the upper platen 108 in a substantially parallel alignment with the lower platen 102 as it approaches a closed position, e.g., as best seen in FIG. 1A. Moreover, the closed position of the upper platen 108 can be varied, e.g., to raise the level of upper platen 108 with respect to lower platen. As a result, regardless of the thickness of the material, the transfers to be applied, or the thickness of the support pads to be used between the upper and lower platens, the alignment of the platens 102, 108 avoids uneven pinching of the material and the transfers positioned between upper and lower platens. Moreover, pads (not shown) may also assist the pressure distribution regardless of irregularities in the thicknesses of the heat applied transfers and the apparel to which it is applied.

At least one of the platens, e.g., the upper platen 108, includes a heating element (not shown) such as conventional resistive heating elements and the like, which may be formed as serpentine or otherwise wound throughout the surface area of upper platen. The heating element is coupled to a typical power supply through a switch and/or the controller, and may be configured for adjusting the temperature of the heating element, e.g., by way of the controller. Further, the temperature of the heating element may be adjusted at a visual display 114 which interfaces with a controller 116, as best seen in FIG. 2. The upper platen 108 may also carry a thermo-couple sensor (not shown) which is wired in a conventional manner to generate temperature information for the controller 116, which may display such information via the display 114. The display 114 may thus be mounted for exposure to the area occupied by the press operator as typically positioned for manipulating and controlling the press, e.g., as best seen in FIG. 1A. The electrical circuit for the heating element may also include a temperature control such as a thermostat.

The controller 116 may generally include computational and control elements (e.g., a microprocessor or a microcontroller). The controller 116 may generally provide time monitoring, temperature monitoring, pressure monitoring, and control. The display 114 may further include various readout displays, e.g., to allow display of a force, temperature, or time associated with operation of the press. Moreover, the display may allow for manipulation of the controller by a user, e.g., by way of a touchscreen interface. The display may thereby be used by the operator to adjust an amount of force applied by the upper platen 108 to the lower platen 102, a cycle time for the force to be applied, and a temperature of the heated platen(s).

The controller 116 may facilitate a variety of user-customized settings for use of the press. In one exemplary illustration, the controller 116 includes a memory for storing one or more programs associated with the application of an indicia to a garment, including a predetermined temperature, a predetermined force, and/or a predetermined cycle time associated with the upper platen. In another exemplary illustration, the programs may include a plurality of stages in the application process, e.g., where the upper platen 108 is applied to a garment with a first pressure that is applied to a garment for a first cycle time, and a second pressure that is subsequently applied for a second cycle time. In some examples, the pressure and cycle time are different, such that a variety of different pressures and cycle times may be applied by the press.

As noted above, the support head 106 generally supports and aligns the upper platen 108 with respect to the lower platen 102. The support head 106 may also be pivotable about an axial support 118, as best seen in FIG. 2, away from the lower platen, to allow placement of a garment upon the lower platen. More specifically, the support head may generally pivot about a pivot shaft 120 disposed within the axial support. The support head 106 may include a drive chain 122 or belt which is rotated by a motor 124 disposed within the support head, thereby rotating the support head 106 about the pivot shaft 120. The motor 124 may be controlled by way of the controller 116.

As briefly described above, a pressure chamber 112 may be employed to selectively move the upper platen 108 with respect to the lower platen 102, thereby selectively imparting a force against the lower platen 102. The pressure chamber 112 may be controlled by any pressure regulating device that is convenient. In one example, and as best seen in FIG. 2, an electric pressure (EP) Regulator 126 in communication with the controller and the pressure chamber may facilitate movement of the shaft(s) of the upper platen. In one exemplary illustration, the EP regulator 126 is an SMC ITV 1050 regulator.

The various components that facilitate automated operation of the press 100 may generally be integrated into the support head 106. For example, as described above the support head may include therein the display 114, controller 116, pressure chamber 112, motor 124, and drive belt 122. Accordingly, the support head 106 may generally house the main components of the press 100 that provide automated operation of the press 100.

In one exemplary illustration, the controller 116 is a Freescale i/MX processor. The processing power available in this exemplary ARM920 based architecture of the i/MX may generally communicate with the display 114, e.g., a color LCD touchscreen. Accordingly, the controller 116 may generally control heating, setting and monitoring of the application pressure, monitoring system health, interpreting touchscreen inputs, and optimizing system operation, all while supervising numerous other system operations simultaneously.

As noted above, the control system may include a memory, e.g., included with controller 116, having the ability to store a large number of application programs. In one example, over 1000 application programs or "recipes" may be stored, each with individual control of, for example, four (4) sub-steps, each with varying pressure and dwell or cycle times. Accordingly, setup time is reduced and consistency is improved, since it effectively eliminates human error. More specifically, by automatically setting and monitoring the pressure during each step, e.g., as supplied by the pressure chamber 112, the operator generally does not have to worry about varying fluctuations in a power supply to the support head. Moreover, the pressure chamber 112 also removes one source of potential error as a result of any inconsistent pressure supplied by the operator. In one exemplary illustration, an air compressor (not shown in FIGS. 1A, 1B, and 2) may be used to supply compressed air to the pressure chamber, which is used to manipulate the upper platen 108 downward against the lower platen 102, e.g., to apply heat to a garment/indicia assembly. The controller 116 may automatically compensate for any changes or inconsistencies in the air supply to the pressure chamber 112, and it may also alert the operator of any problems, e.g., insufficient, or total loss of supplied air pressure. Operator fatigue is also significantly reduced by eliminating the stress of constantly adjusting the press to provide the proper pressure, e.g., via pressure valves or levers, since the only inputs to the press 100 are generally via the touchscreen display 114.

As noted above, the controller 116 may be configured to pivot the support head 106 about the axial support 118. Accordingly, the operation of the press 100 may be integrated with the pivoting of the support head 106 before and/or after the upper platen 108 is forced against the lower platen 102. The ability to apply the upper platen 108 for a predetermined pressure and time may thus be combined with the ability to retract and swing the support head 106 out of the way in a synchronous fashion. The time saved in each print may only be seconds, but in a continuous operation, these seconds quickly multiply into saved hours associated with every job. Moreover, operator fatigue is further reduced by eliminating the need to manipulate the press manually.

The controller 116 may also include a standardized interface (not shown) to allow for system upgrades in the field, e.g., a USB interface. The controller 116 may also allow for multiple levels of user access, e.g., to allow setting limits on a maximum pressure or temperature to be provided by the platen(s). Finally, the controller 116 may also be supplied power via a universal A/C input range of 100-240 VAC at 50/60 Hz.

Figure 3:
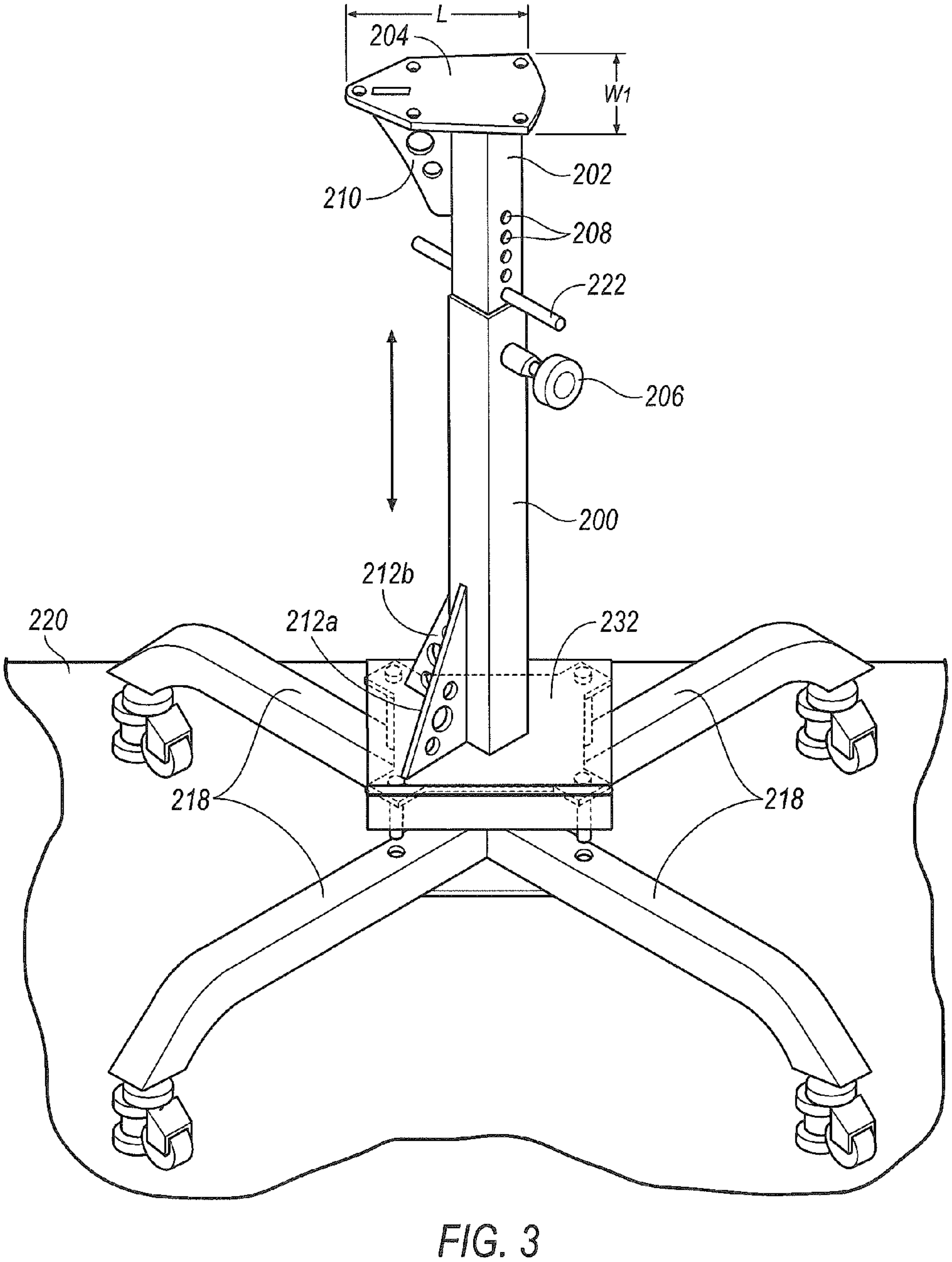
FIG. 3 is a perspective view of an exemplary stand for a press.

As noted above, an exemplary press 100 may be mounted on a stand 104. Turning now to FIG. 3, an exemplary stand 104 is illustrated in further detail. A stand 104 may be adjustable by way of a telescoping receiver tube 200. For example, the receiver tube 200 may generally receive an insert tube 202 which is attached to a support of the press 100, which as illustrated may be a swinger-type press as described in detail above.

Moreover, the support may include a horizontal support plate 204 which extends generally horizontally beneath the press. The horizontal support plate 204 thereby provides a relatively wide support that allows the receiver tube 200 and insert tube 202 of the stand to be spaced horizontally away from the lower platen 102. Moreover, an associated support of the lower platen 102 may be relatively narrow, thereby defining a "throat spacing" that is narrow enough to allow garments to be "threaded" over the lower platen during operation. Accordingly, the shifted position of the lower platen 102 horizontally with respect to the stand 104, and in particular the insert tube 202 and receiver tube 200 which comprise the primary support member of the stand, in combination with a relatively narrow throat spacing, generally creates space around the lower platen that allows garments to be threaded over the lower platen, as will be described further below.

As noted above, the stand 104 may be an adjustable, e.g., telescoping, stand that allows the press to be moved upwards and downwards. As the press may be relatively heavy, e.g., greater than 100 pounds, the stand may include a resistance mechanism that generally allows for easier movement of the stand 104 up and down. For example, a tensioning mechanism such as a spring (not shown) may be provided in the receiver tube 200. More specifically, a spring may be provided that generally compresses or extends in response to downward movement of the insert tube 202, thereby decreasing a force needed to adjust the press upwards or downwards. Other types of tensioning mechanisms may be provided, e.g., a gas shock, or other compliant member, merely as examples. A threaded knob 206 may allow fixation of the insert tube 202 relative to the receiver tube 200 to define a desired height of the press, e.g., by engaging corresponding adjustment apertures 208 defined by the insert tube 202, or by engaging the insert tube 202 directly. In one example, the press may be adjusted upwards and downwards between a lower position where the lower platen 102 is approximately 37 inches above ground level, and an upper position in which the lower platen 102 is approximately 44inches above ground level. This exemplary range of adjustment may allow positioning of the lower platen 102 approximately at the beltline of nearly all adults, e.g., as may be required for operating the press 100. In another exemplary illustration, the adjustment spans a range of approximately 18 inches. Moreover, the assist spring force may be varied to match the particular press employed. In one example, the spring provides a maximum spring/assist force of approximately 100 pounds, corresponding to slightly less than an overall weight of the press 100 supported by the stand 104.

The stand may have a generally vertical orientation, i.e., where the receiver tube 200 and insert tube 202 are each generally vertical. Such a vertical orientation may facilitate adjustment of the stand 104 upwards and downwards by reducing friction between the insert tube 202 and receiver tube 200. By contrast, some examples of previously known stands employ an angled stand construction, which typically was provided to increase stability of the press as mounted to the stand. To increase stability of the stand 104 shown when a press 100 is mounted in a "cantilever" manner, i.e., as described herein with the insert tube 202 and/or receiver tube 200 spaced horizontally away from a geographic center of the platen(s) 102, 108, a vertical support plate 210 may be provided.

Moreover, additional vertically oriented supports 212 may be provided at a lower portion of the stand, e.g., extending generally vertically between the receiver tube and a component of a base portion 214 of the stand 104, e.g., hinge plate 216 or legs 218, as will be described in further detail below. For example, additional vertically extending supports 212 are provided that are each secured to the receiver tube 200 along a vertical edge of the supports 212. The supports 212 may in turn be secured along a bottom edge thereof to one of the support legs 218, or to a hinge plate 216. The vertical support plate 210 and the vertically extending supports 212 may be generally positioned to counteract a moment applied to the stand 104 by the press 100 when the press 100 is mounted to the stand 104.

The support legs 218 may also extend a predetermined distance in a horizontal direction away from the receiver tube 218. More specifically, the support legs may extend a sufficient distance away to, at a minimum, counteract any moment applied by the press to the stand when the press is mounted to the stand and/or during use of the press. Additionally, the support legs 218 may be independently adjustable for length, thereby allowing adjustment of the stand 104 for any desired press that may be secured to the stand 104.

Exemplary press stands may be employed with any type of press that is convenient. For example, as described above and illustrated in FIGS. 1-3, a swinger-type press may be used where the upper platen 108 generally rotates or "swings" horizontally with respect to the lower platen 102. In another exemplary illustration, a clam-type press (not shown) may be used where the upper platen 108 rotates or swings vertically away from the lower platen 102. Moreover, to allow installation of multiple presses or press types to an exemplary stand, a standardized or universal attachment configuration may be employed, e.g., a standardized bolt pattern for securing the horizontal support plate 204 to a bottom support of the press, i.e., horizontal support 201.

As noted above, the "open throat" design provided by the horizontal spacing of the stand 104 with respect to the lower platen 102, the elevation of the lower platen 102 from an associated ground surface 220 or tabletop surfaces (not shown), and the relatively narrow horizontal support plate 204 supporting the lower platen 102 generally allows garments to be "threaded" over the lower platen 102. For example, a shirt may be threaded over the lower platen 102 due to the horizontal or lateral offset between the stand 104, and particular the receiver tube 200 and/or insert tube 202, from a geometric center A of the lower platen, the spacing of the lower platen 102 from the ground below defined by the stand, and the relatively narrow horizontal support 204 beneath the lower platen. Accordingly, a short garment (not shown in FIGS. 1A, 1B, and 3) may be "threaded" over the lower platen, i.e., by inserting the lower platen 102 into the bottom of the shirt, so that a portion of the shirt may be positioned on the lower platen for applying an indicia or design. By contrast, a press sitting directly on a support surface, e.g., a tabletop, counter, or stand without such an offset, generally will not allow a garment to be threaded in the same manner due to the presence of the support surface below the press. Moreover, as noted above this condition would also occur if a stand were provided that were not sufficiently offset with respect to the geometric center A of the lower platen 102.

Figure 4:
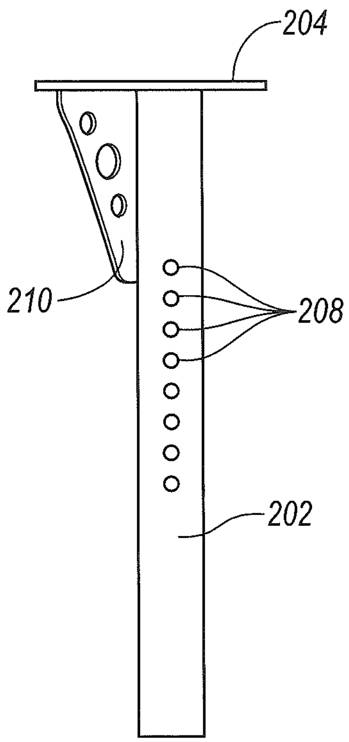
FIG. 4 is a side view of an exemplary insert tube for the stand of FIG. 3.
Figure 5:
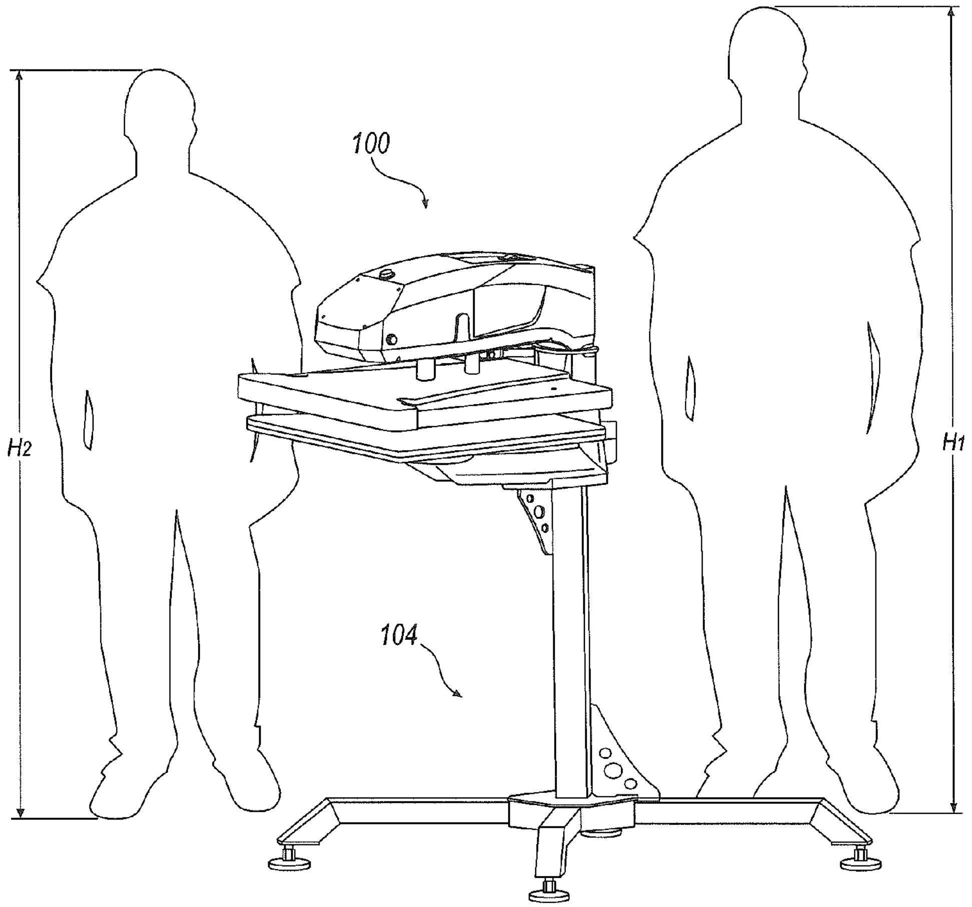
FIG. 5 illustrates a perspective view of an exemplary press illustrating a height adjustable stand facilitating use my operators of varying heights.

Turning now to FIGS. 3 and 4, and as generally noted above, the stand 104 may be adjustable vertically by way of a telescoping receiver tube 200 receiving an adjustable insert tube 202 therein. For example, the receiver tube may generally receive an insert tube 202 which is attached to a horizontal support 204 configured to secure the press 100 thereto. Insert tube 202 may define a plurality of apertures 208 for selectively positioning the insert tube 202 with respect to the receiver tube 200, e.g., using an adjustable lock knob 206.

Moreover, the horizontal support plate 204 may extend generally horizontally beneath the press. The horizontal support plate 204 may generally be designed to accept multiple universal mounting plates for various presses or other equipment, allowing the stand 104 to be configured for use with virtually any press. The horizontal support plate 204 generally provides a relatively wide support structure extending laterally beneath the lower platen 102 that allows the receiver tube 200 and insert tube 202 of the stand 104 to be spaced horizontally away from the lower platen 102. More specifically, as best seen in FIG. 1B the lateral spacing D between the geometric center A of the lower platen 102 and the receiver tube 200 and/or insert tube 202 generally prevents the stand 104 from interfering with threading of a garment, e.g., a shirt, over the lower platen 102. Moreover, the horizontal support 204 of the lower platen may be relatively narrow, e.g., such that a maximum width W and a maximum length L of the horizontal support 204 are smaller than a width or length of the lower platen 102. Accordingly, a "throat spacing" is provided that is narrow enough to allow garments to be "threaded" over the lower platen 102 during operation. Accordingly, the shifted position of the lower platen 102 horizontally with respect to the components of the stand 104, in combination with a relatively narrow throat spacing, generally creates space around the lower platen 102 that allows garments to be threaded over the lower platen 102. The horizontal support plate 204 may generally be designed with the ability to permanently mount to a press, or to mount a press for easy removal, e.g., via quick release pins. Additionally, the support plate 204 and stand 104 may generally be portable, thereby allowing for easier transportation. For example, the stand 104 may be assembled with one or more quick-connect type fasteners which allow the stand to be folded or taken apart, e.g., for transportation.

As noted above, the stand 104 may be an adjustable, e.g., telescoping, stand that allows the press 100 to be moved upwards and downwards. Allowing for height adjustment, e.g., as described above in regard to FIGS. 1A, 1B, and 3, may facilitate proper ergonomic positioning for repetitive work. As the press 100 itself may be relatively heavy, e.g., greater than 100 pounds, the stand 104 may include a resistance mechanism that generally allows for easier movement of the stand up and down. For example, a tensioning mechanism such as a spring may be provided in the lower receiver tube. More specifically, a spring (not shown) may be provided that generally compresses or extends in response to downward movement of the insert tube, thereby decreasing a force needed to adjust the press upwards or downwards. Other types of tensioning mechanisms may be provided, e.g., a gas shock (not shown in FIGS. 1A, 1B, and 3), or other compliant member, merely as examples. To accommodate frequent changes in height, or components of varying weight, the stand 104 may, in some examples, include a motor and lead screw to raise & lower the stand. Alternatively or in addition, a threaded knob 206 as described above may allow fixation of the insert tube 202 relative to the receiver tube 200. The threaded knob 206 may be any cross sectional shape that is convenient, e.g., square, round or any other shape that is convenient. Moreover, the knob 206 may generally define a desired height of the equipment or press 100, e.g., by engaging corresponding adjustment apertures 208 or by engaging the insert tube 202 itself Other types of retention mechanisms may be provided, e.g., a pin, spring loaded clip or other member, merely as examples. In addition, a secondary safety pin 222, may be added to the upper portion of the telescoping stand, e.g., in insert tube 202, to ensure that the insert tube 202 will generally not fall below a certain level.

Figure 9:
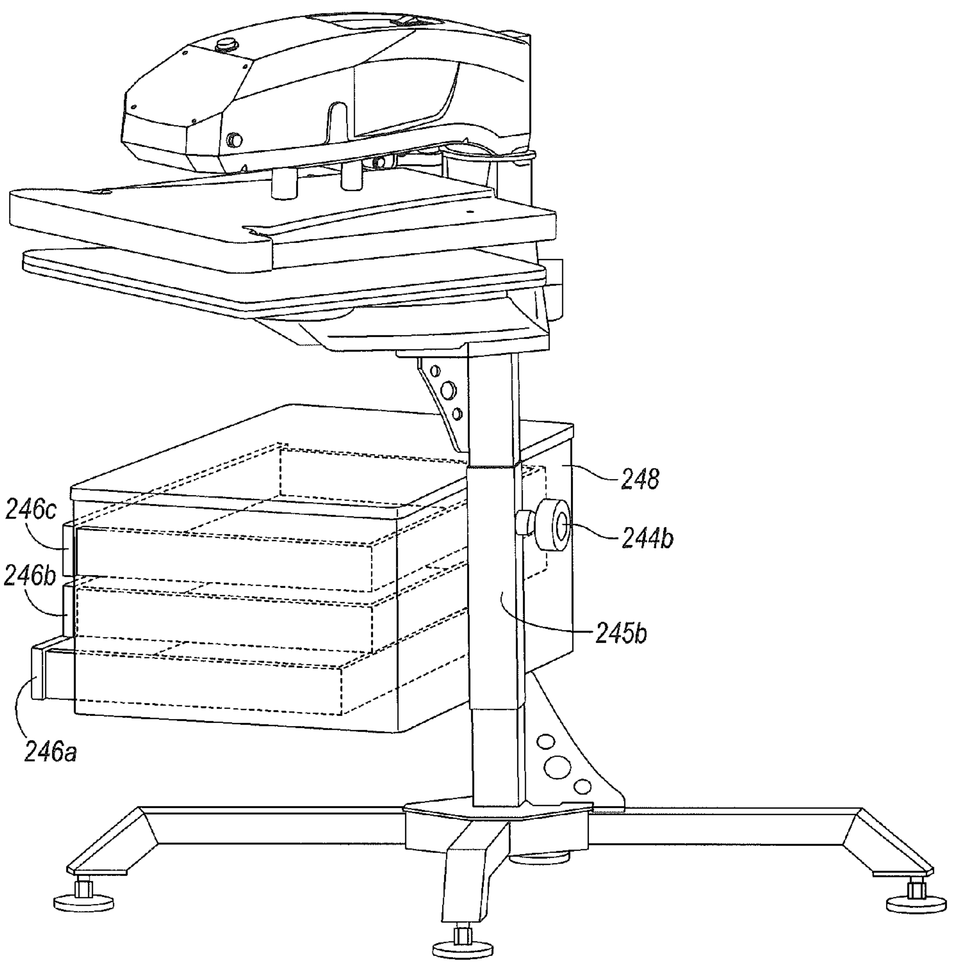
FIG. 9 illustrates a perspective view of an exemplary stand having a plurality of drawers.

Accordingly, the stand 100 may be positioned between lower and upper positions to fit different operators, e.g., defining varying heights H1, H2, as best seen in FIG. 9. In one exemplary illustration, the stand 104 may be adjusted upwards and downwards between a lower position, where the lower platen 102 of the stand 100 is approximately 37 inches above ground level, and an upper position in which the lower platen 102 is approximately 44 inches above ground level. This exemplary range of adjustment may allow positioning of the lower platen 102 approximately at the beltline of nearly all adults, e.g., as may be required for operating the press 100 or equipment. These measurements may vary based on make and model of equipment or press being attached. In another exemplary illustration, the adjustment range of the stand 104 spans a range of approximately 18 inches. Moreover, the assist spring force may be varied to match the particular press 100 employed. In one example, the spring provides a maximum spring/assist force of approximately 100 pounds, corresponding to slightly less than an overall weight of the press 100 supported by the stand.

As shown in FIGS. 1A, 1B, and 3, the stand may have a generally vertical orientation, i.e., where the receiver tube 202 and insert tube 200 are each generally vertical. Such a vertical orientation may facilitate adjustment of the stand 104 upwards and downwards by reducing friction between the insert tube 202 and receiver tube 200. By contrast, some examples of previously known stands employ an angled stand construction, which typically was provided to increase stability of the press as mounted to the stand. To increase stability of the stand shown when a press is mounted in a vertically oriented or "cantilever" manner, i.e., with the insert tube 202 and/or receiver tube 200 spaced horizontally away from a geographic center A of the platen(s), the vertical support plate 212 may be provided. Moreover, additional vertically oriented supports 212 may be provided at a lower portion of the stand, e.g., extending generally vertically between the receiver tube 202 and the base structure of the stand 104, e.g., the support legs 218. As best seen in FIG. 3, a first support 212*a* is secured along its bottom edge to a first one of the support legs 218, while a second support 212*b* is secured along its bottom edge to a second one of the support legs 218. The vertical support plate 210 and the vertically extending supports 212*a*, 212*b* on the lower legs 218 may be positioned to counteract a moment applied to the stand 104 by the equipment and/or press 100 when mounted to the stand 100.

Figure 6:
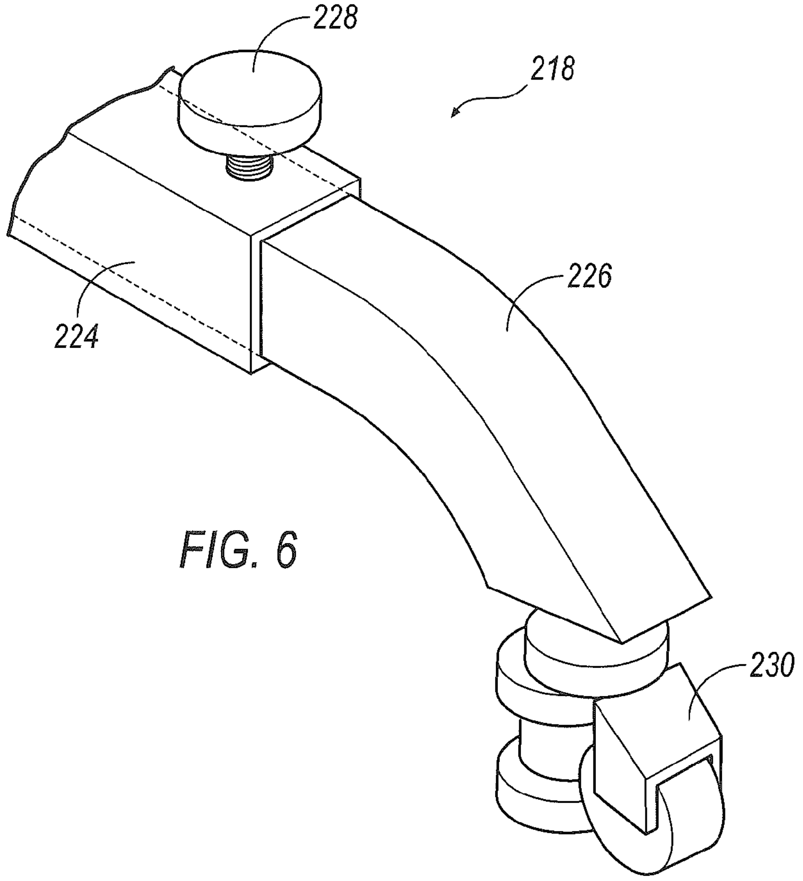
FIG. 6 illustrates a perspective view of an exemplary support leg of a stand.

The support legs 218 may also extend or telescope a predetermined distance in a horizontal direction away from the receiver tube. More specifically, as best seen in FIG. 6, one or more of the support legs 218 of the stand 104 have a support leg receiver tube 224, in which a support leg insert tube 226 is received to allow selective extension of the support leg insert tube 226. The support leg 218 may thereby be adjusted to extend a sufficient distance away from the receiver tube 200 and/or insert tube 202, thereby generally counteracting any moment applied by the equipment or press 100 to the stand 104 when mounted or in use. A lock knob 228 and fixed adjustable foot or caster 230 may also be provided.

Figure 7A:
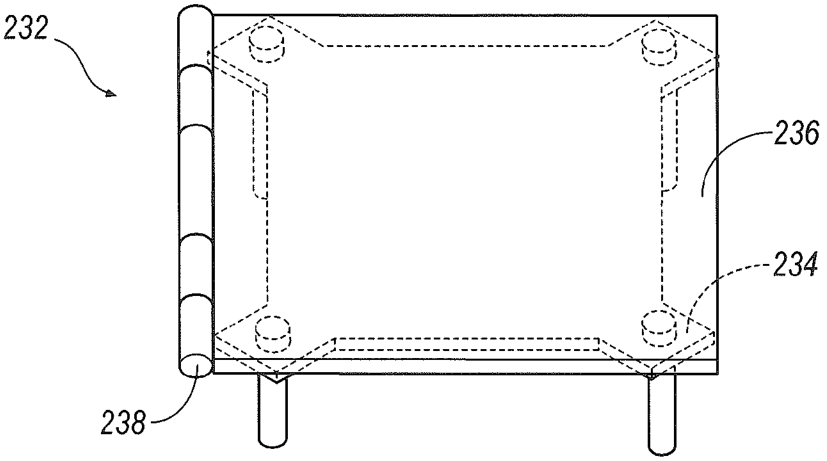
FIGS. 7A and 7B illustrate perspective views of a hinged support plate of a stand in an aligned position and in a pivoted position, respectively.
Figure 7B:
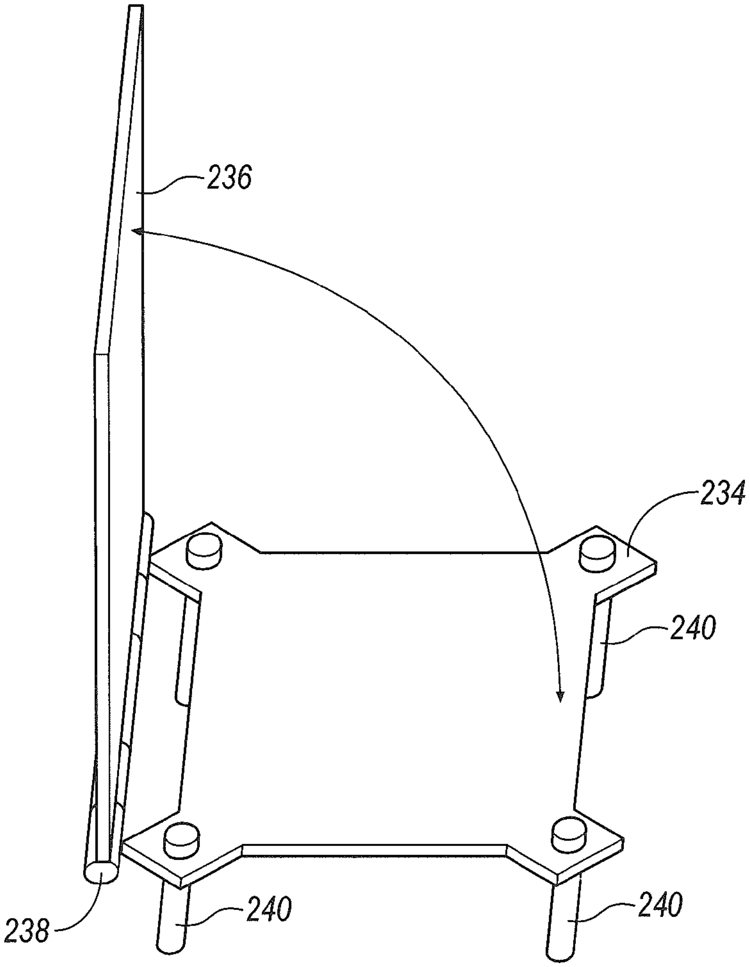

The stand 104 may also be collapsible to facilitate transportation. By contrast, some examples of previously known stands are fixed and too large to be transported easily. As shown in FIGS. 3, 7A, and 7B, the stand 104 may employ a hinged base 232 at the base of the receiver tube 200. The hinged base 232 may include a base plate 234 which is selectively secured to the support legs 218, e.g., via bolts 240. The hinged base 232 may further include a stand plate 236 which is hinged with respect to the base plate 234 via a hinge 238. The receiver tube 200 of the stand 104 may be secured to the stand plate 236, such that the receiver tube 200 pivots with the stand plate 236 with respect to the base plate 234. Accordingly, the receiver tube 200 and the entire support structure of the stand 100 may generally be pivoted approximately ninety (90) degrees so the receiver tube 200 is approximately parallel with respect to the legs 218, thereby minimizing overall size and facilitating transport of the stand 104. Moreover, the receiver tube 200 itself may be selectively removable from the base portion of the stand 104, including the legs 218.

Figure 8:
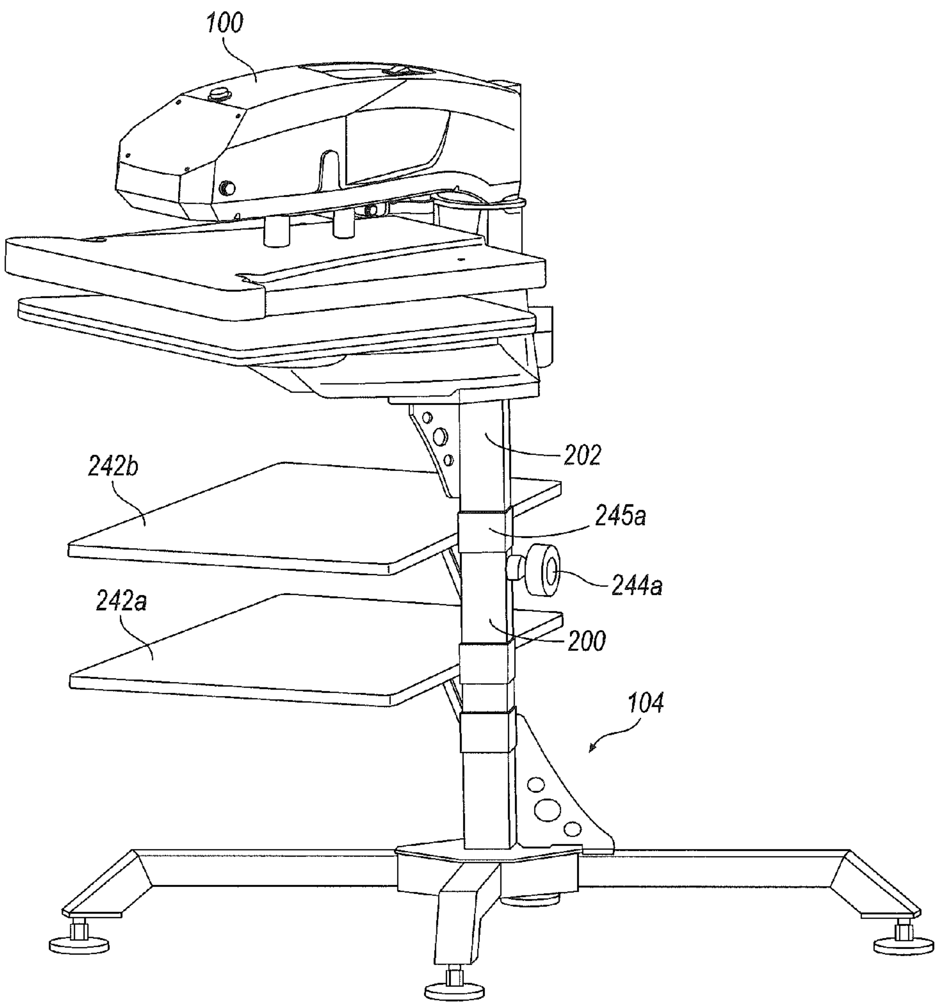
FIG. 8 illustrates a perspective view of an exemplary stand having a plurality of adjustable shelves.
Figure 10A:
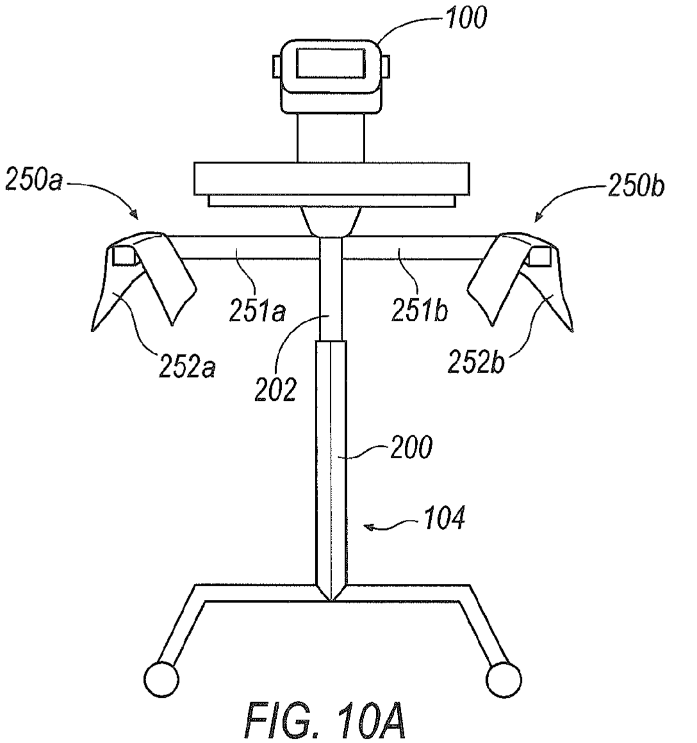
FIGS. 10A and 10B illustrate side and top views, respectively, of an exemplary stand having a plurality of garment placement arms.
Figure 10B:
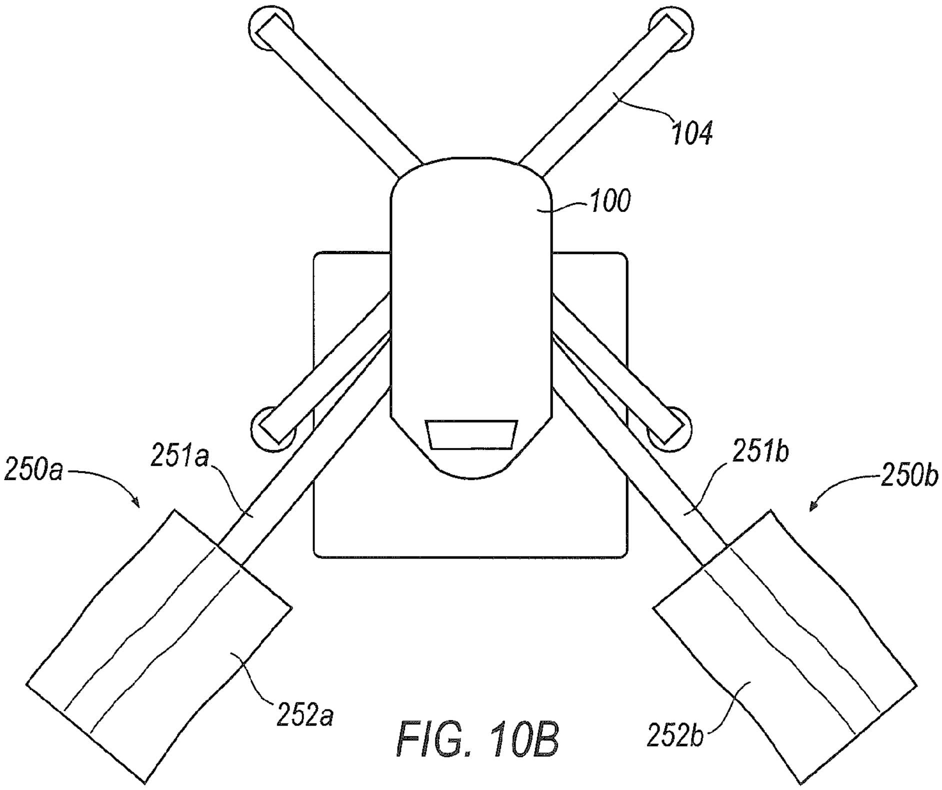

As shown in FIGS. 8-10, the stand 104 may have a variety of optional production accessories, each designed to increase efficiency of the operator and press 100 via improved ergonomics, and minimize operational motion. Attachments may be designed such that multiple accessories, or accessories of different types, may be installed on the same stand 104 simultaneously. By contrast, previous known stands support only a heat press itself, and therefore do not increase efficiency. These attachments may be fixed to the receiver tube 200 or insert tube 200, or to a universal attachment point (not shown) at the horizontal support plate 204. In one exemplary illustration, one or more shelves 242*a*, 242*b* may be attached to the receiver tube 200 or insert tube 200, thereby allowing a space for keeping cover sheet and/or transfers (not shown) for use with garments, as best seen in FIG. 8. The shelves 242 may be adjustable in height with respect to the stand 104, e.g., by way of a lock knob 244 that facilitates movement of a sliding sleeve 245*a* that fits around the receiver tube 200 or insert tube 202. In another example, a cabinet 248 having plurality of drawers 246*a*, 246*b*, 246*c*, as best seen in FIG. 9, is provided which provides for storage of heat press accessories. As yet another example, in FIGS. 10A and 10B a pair of garment stations 250*a*, 250*b* have been added that are secured to the press 104, e.g., to the insert tube 202, to provide a place to hang garments, e.g., for staging before and/or after pressing. More specifically, the garment stations 250 may each include respective extension arms 251*a*, 251*b* which position garment placement surfaces 252*a*, 252*b* within generally easy reach of an operator during use of the press 100. Alternatively, hanging rods may be provided in addition to or in place of the garment stations 250 for garment storage.

The exemplary illustrations are not limited to the previously described examples. Rather, a plurality of variants and modifications are possible, which also make use of the ideas of the exemplary illustrations and therefore fall within the protective scope. Accordingly, it is to be understood that the above description is intended to be illustrative and not restrictive.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "the," etc. should be read to recite one or more of the indicated elements unless a claim recites an explicit limitation to the contrary.

The invention claimed is:

1. A press, comprising:
- an upper platen;
- a lower platen disposed below and generally aligned with the upper platen;
- a support head adapted to move the upper platen between an open position, wherein the upper and lower platens are spaced away from one another, and a closed position, wherein the upper platen is pressed against the lower platen; and
- a stand positioned on a ground surface and defining a throat spacing beneath the lower platen, the stand being spaced horizontally away from a geometric center of the lower platen;
- wherein the stand is adjustable between a plurality of heights.

2. The press of claim 1, wherein the stand includes a plurality of predetermined positions between an uppermost stand position and a lowermost stand position.

3. The press of claim 1, wherein the stand includes a support plate, the lower platen selectively secured to the support plate, the support plate defining a maximum width and a maximum length, the maximum width and the maximum length each being less than a corresponding dimension of the lower platen.

4. The press of claim 3, wherein the support plate is a horizontal support plate.

5. The press of claim 1, wherein the press includes at least one shelf selectively removable from the stand.

6. The press of claim 1, wherein the press includes at least one drawer assembly selectively removable from the stand.

7. The press of claim 1, wherein the support head extends from an axial support, the support head configured to rotate about the axial support, wherein the platens are aligned parallel to one another as the support head rotates about the axial support.

8. The press of claim 7, wherein the support head includes a motor configured to rotate the support head about the axial support.

9. The press of claim 1, wherein the controller is configured to apply the upper platen against the lower platen with at least one of a predetermined time and a predetermined force.

10. The press of claim 9, further comprising a display positioned on the support head, the display configured to allow selection of the at least one of a predetermined time and a predetermined force.

11. The press of claim 1, wherein the support head includes a pneumatic cylinder configured to apply a pressure against the lower platen with the upper platen.

12. The press of claim 1, wherein the stand comprises a receiver tube supporting the press, the receiver tube extending generally vertically from at least one support leg of the stand.

13. The press of claim 12, further comprising an insert tube received within the receiver tube, the insert tube selectively adjustable.

14. The press of claim 11, wherein the receiver tube is mounted to a hinged support configured to pivot the receiver tube with respect to at least one support leg.

15. The press of claim 11, further comprising a plurality of support legs extending horizontally away from the receiver tube.

16. The press of claim 15, wherein at least one of the support legs is selectively extendable with respect to the receiver tube.

17. The press of claim 1, further comprising a plurality of selectively secured accessories, the selectively secured accessories including at least one of a garment rest, a shelf, and a drawer.

18. A press, comprising:
- an upper platen;
- a lower platen disposed below and generally aligned with the upper platen;
- a support head adapted to move the upper platen between an open position, wherein the upper and lower platens are spaced away from one another, and a closed position, wherein the upper platen is pressed against the lower platen; and
- a stand positioned on a ground surface and defining a throat spacing beneath the lower platen, the stand being spaced horizontally away from a geometric center of the lower platen, the stand including:
  - a receiver tube supporting the press and extending away from a plurality of support legs, the receiver tube extending generally vertically from the support legs, the support legs extending horizontally away from the receiver tube, the receiver tube mounted to a hinged support configured to pivot the receiver tube with respect to at least one of the support legs; and
  - an insert tube received within the receiver tube, the insert tube selectively adjustable;
- wherein the stand is adjustable between a plurality of heights.

19. The press of claim 18, further comprising a plurality of selectively secured accessories, the selectively secured accessories including at least one of a garment rest, a shelf, and a drawer.

20. The press of claim 18, wherein the stand includes a plurality of predetermined positions between an uppermost stand position and a lowermost stand position.

* * * * *